(12) United States Patent
Koudsi et al.

(10) Patent No.: US 10,955,668 B2
(45) Date of Patent: Mar. 23, 2021

(54) OPTICAL DISPLAY SYSTEM FOR AUGMENTED REALITY AND VIRTUAL REALITY

(71) Applicant: Optecks, LLC, Bixby, OK (US)

(72) Inventors: Badia Koudsi, Bixby, OK (US); Hakki H. Refai, Bixby, OK (US)

(73) Assignee: Optecks, LLC, Bixby, OK (US)

( * ) Notice: Subject to any disclaimer, the term of this patent is extended or adjusted under 35 U.S.C. 154(b) by 0 days.

(21) Appl. No.: 15/896,889

(22) Filed: Feb. 14, 2018

(65) Prior Publication Data

US 2018/0231784 A1    Aug. 16, 2018

Related U.S. Application Data

(60) Provisional application No. 62/458,808, filed on Feb. 14, 2017, provisional application No. 62/547,352, filed on Aug. 18, 2017.

(51) Int. Cl.
| | |
|---|---|
| *G02B 27/42* | (2006.01) |
| *G02B 27/01* | (2006.01) |
| *H04N 13/332* | (2018.01) |
| *H04N 13/344* | (2018.01) |
| *G02B 30/35* | (2020.01) |

(52) U.S. Cl.
CPC ......... *G02B 27/0172* (2013.01); *G02B 27/42* (2013.01); *G02B 30/35* (2020.01); *H04N 13/332* (2018.05); *H04N 13/344* (2018.05); *G02B 2027/0123* (2013.01); *H04N 2213/001* (2013.01)

(58) Field of Classification Search
CPC .............. G02B 27/0172; G02B 27/2235; G02B 27/42; G02B 2027/0123; H04N 13/344; H04N 13/332; H04N 2213/001
See application file for complete search history.

(56) References Cited

U.S. PATENT DOCUMENTS

| | | | | |
|---|---|---|---|---|
| 5,162,928 A | * | 11/1992 | Taniguchi | G02B 27/01 |
| | | | | 359/13 |
| 5,517,307 A | * | 5/1996 | Buehring | G01B 5/004 |
| | | | | 250/237 G |

(Continued)

OTHER PUBLICATIONS

International Search Report and Written Opinion regarding PCT Serial No. PCT/US18/18224 dated May 2, 2018.

*Primary Examiner* — Jose R Soto Lopez
(74) *Attorney, Agent, or Firm* — Dunlap Codding, P.C.

(57) ABSTRACT

Optical display systems and methods for providing three-dimensional and two-dimensional convergence corrected images to a user are described. The optical display systems may include at least two image generators producing a plurality of rays forming a plurality of images. A diffraction enhanced imaging system may be configured to collect the rays produced and control convergence angle of each ray at specific wavelengths into an optical waveguide. An in-coupling diffraction system may couple the rays into the optical waveguide. A wavelength compensated beam expander may expand horizontal extension of the images and an output coupling and vertical expansion system may magnify the images in a vertical direction and direct light towards a user at specific angles creating a wide field of view.

25 Claims, 11 Drawing Sheets

(56) References Cited

U.S. PATENT DOCUMENTS

| | | | |
|---|---|---|---|
| 6,262,846 B1* | 7/2001 | Nakai | G02B 5/1895 359/566 |
| 8,165,436 B2* | 4/2012 | Mossberg | B29D 11/0074 385/37 |
| 8,233,204 B1* | 7/2012 | Robbins | G02B 26/0808 359/15 |
| 8,605,358 B2* | 12/2013 | Ushigome | G02B 27/4272 359/576 |
| 9,019,615 B2* | 4/2015 | Travis | G02B 27/0081 359/630 |
| 9,753,297 B2* | 9/2017 | Saarikko | G02B 27/44 |
| 9,823,475 B2* | 11/2017 | Zhao | G02B 6/003 |
| 9,933,684 B2* | 4/2018 | Brown | G02B 5/1814 |
| 9,959,818 B2* | 5/2018 | Bohn | G02B 27/0101 |
| 10,061,124 B2* | 8/2018 | Tervo | G02B 27/0172 |
| 10,156,725 B2* | 12/2018 | TeKolste | G02B 6/0026 |
| 2002/0122256 A1* | 9/2002 | Mitamura | H04B 10/25133 359/577 |
| 2003/0210467 A1* | 11/2003 | Song | G02B 27/0172 359/630 |
| 2004/0004767 A1* | 1/2004 | Song | G02B 27/0172 359/566 |
| 2004/0062502 A1* | 4/2004 | Levola | G02B 27/0081 385/129 |
| 2004/0130783 A1* | 7/2004 | Solomon | G02B 27/017 359/462 |
| 2005/0271325 A1* | 12/2005 | Anderson | G02F 1/295 385/40 |
| 2006/0228073 A1* | 10/2006 | Mukawa | G02B 17/0856 385/31 |
| 2007/0052929 A1* | 3/2007 | Allman | H04N 9/3111 353/31 |
| 2009/0052040 A1* | 2/2009 | Suzuki | G02B 5/1866 359/576 |
| 2010/0149073 A1* | 6/2010 | Chaum | G02B 27/0172 345/8 |
| 2010/0202048 A1* | 8/2010 | Amitai | G02B 27/28 359/485.02 |
| 2010/0214659 A1* | 8/2010 | Levola | G02B 27/4272 359/566 |
| 2011/0242661 A1* | 10/2011 | Simmonds | G02B 27/0101 359/567 |
| 2012/0062998 A1* | 3/2012 | Schultz | B29D 11/00663 359/630 |
| 2012/0127577 A1* | 5/2012 | Desserouer | G02B 27/0101 359/566 |
| 2012/0307165 A1* | 12/2012 | Wang | G02F 1/29 349/2 |
| 2013/0222384 A1* | 8/2013 | Futterer | G02B 27/0103 345/426 |
| 2013/0229712 A1* | 9/2013 | Kress | G02B 27/1086 359/572 |
| 2013/0278631 A1* | 10/2013 | Border | G02C 5/143 345/633 |
| 2013/0314793 A1* | 11/2013 | Robbins | G02B 27/0172 359/573 |
| 2014/0104665 A1* | 4/2014 | Popovich | G02B 27/0103 359/15 |
| 2014/0140653 A1* | 5/2014 | Brown | G02B 27/0172 385/10 |
| 2014/0204455 A1* | 7/2014 | Popovich | G02B 6/0028 359/316 |
| 2014/0300966 A1* | 10/2014 | Travers | G03H 1/2205 359/558 |
| 2015/0021480 A1* | 1/2015 | Chrisp | G01J 3/0208 250/339.05 |
| 2016/0041384 A1* | 2/2016 | Robbins | G06F 3/013 345/156 |
| 2016/0085300 A1* | 3/2016 | Robbins | G02B 27/0093 345/633 |
| 2016/0147003 A1* | 5/2016 | Morozov | G02B 27/10 359/11 |
| 2016/0154150 A1* | 6/2016 | Simmonds | G02B 5/1842 385/37 |
| 2017/0018214 A1* | 1/2017 | Black | G02B 26/0883 |
| 2017/0018215 A1* | 1/2017 | Black | G02F 1/29 |
| 2017/0131551 A1* | 5/2017 | Robbins | G02B 27/0172 |
| 2017/0299860 A1* | 10/2017 | Wall | G02B 27/0172 |
| 2017/0322414 A1* | 11/2017 | Ishii | G02B 3/08 |
| 2018/0017801 A1* | 1/2018 | Chang | H04N 13/324 |
| 2018/0299678 A1* | 10/2018 | Singer | G02B 6/0076 |
| 2019/0101760 A1* | 4/2019 | Ayres | G02F 1/295 |

\* cited by examiner

OPTICAL DISPLAY SYSTEM FOR AUGMENTED REALITY AND VIRTUAL REALITY

CROSS-REFERENCE TO RELATED APPLICATION(S)

The present application claims the benefit of U.S. Ser. No. 62/458,808, filed Feb. 14, 2017, and U.S. Ser. No. 62/547,352, filed Aug. 25, 2017, which are hereby incorporated by reference in their entirety.

BACKGROUND

Augmented reality (AR) and virtual reality (VR) systems promise to revolutionize the way humans interact with each other and the world around them. These technologies provide human eyes additional information that either augments or supplant visual information received from the outside world to entertain, inform and/or educate a user. Generally, VR systems immerse a user in a virtual world, limiting input from the outside world, and AR systems superimpose information and/or virtual images onto a scene observed by a user. The user may be allowed to engage in interactive games, view information (e.g., instruction manuals, handbooks) while performing a task or exploring, conduct virtual training, and/or visualize digital information. For example, AR systems may use a head's up display (HUD), overlaying the outside world with images and/or data screens containing information adding to a user's experience.

In general, AR displays consist of four common main subsystems, each of which may impact the display performance. First, the optical system generates, manipulates and presents images to the viewer in a manner that causes a user to perceive existence of virtual objects within an outside visual world. Second, environmental mapping may use cameras and sensors to obtain knowledge of the surrounding environment, such as walls, desks and other surfaces that could support images and detect a user's movement within the environment. Third, head and eye tracking systems may provide feedback on where a user wishes to look and the existence of any alignment issues for which the system must accommodate. Finally, extensive software and hardware processing systems may contain the computing power that controls, coordinates, and drives the actions of the other three subsystems.

Design and implementation of the optical system generally use either bulk optics systems or waveguide systems. Bulk optical systems use a combination of lenses and custom designed prisms to magnify and distribute the image to a user's eye. The image generator projects light into a free-form prism—the shape of the prism deviates from regular geometric figures—and total internal reflection (TIR) at the surface combined with the shape provides the means to magnify the image and direct the magnified image toward a user's eye. A second prism placed nearly in contact with the first prism corrects distortions caused by the first prism and may allow light from the external world to pass through to a user's eye. This solution possesses several drawbacks that may limit use for practical applications, including the large size and weight of the prisms, incomplete correction of image distortions, small field of view (FOV), and no practical path to implementing methods to resolve vergence-accommodation conflict. Examples of this type of system include multi-focal plane displays and Google Glass, manufactured by Google having a principle place of business in Mountain View, Calif.

The more current offering of AR head-mounted displays use an optical waveguide system to connect the output of the image generator to a user's eye. The waveguide generally may consist of a piece of glass cut thin in one dimension, typically in width. Light rays propagate through the waveguide by TIR, and optical elements placed within the waveguide or along the walls of the waveguide provide means to couple light into the waveguide from the image generator, modify the magnification and divergence of the image, and couple the light out of the waveguide towards the user's eye.

Present waveguide systems use either diffractive or reflective optical elements in conjunction with the waveguides. Reflective elements possess an advantage of operating at all RGB wavelengths, greatly reducing the number of waveguides needed. Current implementations of such systems, however, suffer from bulkiness and scattering that may deteriorate image quality. Most systems may utilize diffractive optical elements to overcome the size and scattering constraints of the reflective elements. Diffractive elements consist of periodic variations in the waveguide's refractive index (holographic optical elements or HOEs), periodic variations in the surface structure, created by patterning or cutting of material on the waveguide surface, computer-generated holograms (CCH), sub-wavelength digital elements (SWE) or dynamic diffractive optics.

Diffractive elements may present many advantages, including small size and weight, the ability to create them directly on or within the waveguide, the ability to tune the element to pass light from the external scene with minimal distortion or dimming, and ease of design. Diffractive elements also may present three key disadvantages. First, the elements may operate in a very narrow band of wavelengths, and thus systems based on diffractive elements may require three waveguides, with each waveguide individually processing one of the RGB wavelengths thus adding to the size and cost of the display system. Second, diffractive elements display high angular selectivity, which may limit the range of ray angles directed by the grating towards the user, thus significantly limiting the FOV achieved by the display. Third, many of the diffractive elements currently in use have complex shapes that may require lengthy and/or costly manufacturing processes. Differences in the use and implementation of the optical elements drive the differences in performance achieved by existing display offerings.

Many development-level systems currently exist in the market that attempt to harness and deliver the potential of AR, however such systems suffer from a number of issues that limit their potential and/or effectiveness for long term wearing and broad spectrum adoption. For example, existing systems may limit the field of view (FOV) presented to a user. The human eyes capture images from angles over 180 degrees horizontally and 60 degrees vertically. Current optical systems used to present three-dimensional (3D) images to a user's eyes may restrict the field of view (FOV) to 30 degrees by 17 degrees. This limitation may decrease the amount of information the system is able to present to the user in a single frame. The following prior art system provide an overview of those seen typically within the industry.

The BAE System having a principle place of business in Farnborough, United Kingdom, manufacturers the Quantum Display. The Quantum Display generally utilizes a set of diffraction gratings expanding the exit pupil and generating a range of output ray angles. The display positions the image projector at a specific angle with respect to a horizontal waveguide in order to accommodate for the angular selectivity of the diffraction gratings. The optics and mechanics required to achieve the optimal launch conditions add significantly to the size and weight of the display, Light propagating through the first waveguide interacts with a diffraction grating placed or etched on the top surface, and the grating diffracts a portion of the light into a vertical waveguide at each point along horizontal waveguide. A second grating on the surface of the vertical waveguide performs a similar function, coupling light out at each point of the waveguide surface at a range of angles determined by the design of the diffraction grating. The current design projects a collimated output beam and thus produces an output at infinity, and does not provide for any accommodation allowance. The display produces a 30° FOV for one eye (monocular) and uses only one set of waveguides and gratings, limiting current versions to monochrome image generation. The angular positioning of the source and the relatively large thickness of the waveguide make expanding the system to binocular, RGB image generation impractical.

The Lumus display, as described in patent applications filed by Lumus (U.S. Pat. No., 7,391,573, U.S. Ser. No. 12/596,823 and U.S. Ser. No. 12/092,818, for example), generally utilizes a set of reflective surfaces to perform in-coupling, expand the exit pupil and generate a range of output angles. The reflective surfaces rely on the reflection and transmission of light at the boundary between two materials of different refractive index. Each reflector in the waveguide uses a multi-layer coating to produce a partially reflecting mirror. Light rays striking the mirror at certain angles are partially reflected, sending light toward the user's eyes. An element design may prevent reflection from the back of the element, which would send light out the side or rear of the waveguide, away from the user's eye. Several elements distributed along the length of the waveguide couple light out from an extended length along the horizontal direction, effectively expanding the exit pupil in this direction. A similar optical element at the waveguide input couples light into the waveguide from an image generator. A series of lenses, mirrors, and prisms conditions and converges the light from the image generator to coupling and create the divergent beam to present a virtual image to the user. An additional optic may distribute light in the vertical direction to increase the exit pupil in the vertical direction as well as the horizontal direction.

The Lumus display exhibits many design challenges that may limit effectiveness. First, the in-coupling system requires custom, heavy, and bulky optics and a 45° angle, adding weight, size and cost to the system. Second, the eye pupil expansion in both the vertical and horizontal direction may occur relatively slowly, requiring the beam to travel a long distance within the waveguide (around half an inch) before reaching the out-coupling reflective elements. As a result, only a small fraction (around $⅓^{rd}$) of the glass area in front of the user's eye may contribute to the production of an image, creating significant dead space in the display. Since most of the FOV produced by a display depends on the size of the emitting area, the small image-producing area greatly restricts the FOV to below 30 degrees. Third, the in-coupling optical design may need to compensate for the polarization-dependent nature of the reflective out-coupling elements. To ensure that each polarization state reflects the same amount of power at each mirror, the in-coupling system may need to carefully control the angle at which each state enters the waveguide. The solution used in the Lumus display contributes to the size, weight and cost of the system.

Fourth, the display produces virtual images at a fixed accommodation and provides no method for adjusting the accommodation to address the vergence-accommodation conflict. In natural viewing, a user's eyes adjust to objects at different distance by changing the focus of the lens (accommodation) to produce a clear image on the user's retina, and by rotating the eyes inward or outward such that the line of sight from the two eyes may converge at the same distance as the object (vergence). The Lumus display presents images at a fixed distance from the eyes such that the images create a virtual object at a perceived distance from the viewer. The eyes may rotate to adapt the vergence based on perceived depth, but the eyes remain focused on the screens, causing an unnatural disconnect between the vergence and accommodation activities. This disconnect may cause moderate to severe problems for a user, including eye strain, headaches and discomfort or disorientation. Further, such issues may worsen over extended viewing periods.

Lastly, the current design of the reflective layers of the Lumus display produces scattering, which may reduce image clarity and/or may increase power required to produce an image. Increased power requirements may strain the limited battery capacity, limiting use time.

The Hololens system is manufactured by Microsoft, having a principle place of business in Redmond, Wash., and utilizes a series of specialized diffractive gratings to perform in-coupling, exit pupil expansion, and out-coupling. Generally, light from the image generator may enter perpendicular to the waveguide and couple into the waveguide at specific angles through a specially designed diffraction grating. The Hololens system is further described in the article "Diffractive optics for virtual reality displays," *Journal of the Society for Information Display*, Vol. 14, No, 5, pp. 467-475, 2006, and is herein incorporated by reference in its entirety. The grating possesses a tilted structure that couples light in the outward direction toward the eye, with little or no power directed away from the eye. An extended, cone-shaped grating panel uses a similar grating structure to expand the exit pupil in the horizontal direction, directing fractions of light to the larger grating, which expands the exit pupil in the vertical direction. The area of the larger grating may effectively define the Hololens' exit pupil. The modulation depth of both gratings increases with distance from the in-coupling point such that the same amount of power reflects from each point of the grating to produce a uniform intensity image. A liquid crystal display contained in a separate layer provides selective occlusion of the external scene to improve image contrast.

The Hololens design presents many design challenges and choices that may limit the system effectiveness and commercial viability. First, the design of the diffraction gratings makes the gratings exceedingly difficult and quite costly to manufacture. Second, the diffraction gratings operate efficiently at only a single wavelength. To project RGB images, the display uses three parallel waveguides, one for each color, with alignment carefully controlled to match pixel positions in each waveguide. Each eye therefore may require nine of the costly and complicated gratings, for a total of 18 gratings, quickly driving the cost of the system out of the range of most potential users. The use of multiple layers also increases the size and weight of the display, particularly at the front. Third, difficulties in producing the gratings may also limit the maximum area of the out-coupling grating and thus may limit the FOV. The Hololens achieves a FOV of 30 degree horizontally and 17 degrees vertically resulting in a restricted virtual world for the user. Such a small FOV restrict the user's ability to work with multiple objects simultaneously and/or view an entirety of a virtual scene (e.g., objects on edge of scene may disappear or cut-off). Because of the limited FOV, the user can typically see only one complete object at a time, with other objects out of view or only party visible, contrary to the wide FOV concept pictures presented on the Hololens web page. In order to view a complete scene, a user may be required to turn their head and center each object within the FOV, causing other objects to disappear and/or placing motion strain on a user's neck. Lastly, the fixed nature and angular selectivity of the gratings precludes adding optical components that would adjust beam divergence to alleviate the vergence-accommodation conflict.

The optical display manufactured by Magic Leap, having a principle place of business in Plantation, Fla., and described in U.S. Pat. No. 8,950,867, "Three Dimensional Virtual Augmented Reality Display System," and U.S. Pat. No. 9,310,559, "Multiple Depth Plane Three-dimensional Display Using a Waveguide Reflector Array Projector," utilizes a combination of beam-splitters and micro-reflectors to produce the only prior art display attempting to address the accommodation-vergence conflict. Generally, light couples from the image generator into a coupling tube, with the coupling process using a fiber or diffractive element, depending on the specific implementation. The coupling tube may contain a series of beam splitters that reflect a portion of the light into an array of waveguide tubes. The coupling tube may expand the exit pupil in the vertical directions. Each waveguide tube contains a series of curved reflective elements that serve to expand the exit pupil in the horizontal direction (similar to the Lumus display described herein) and to produce a specific divergence in the beam that may cause the virtual image to appear at a specific distance from the user. To produce images at varying distances, multiple coupling-waveguide tube combinations may be stacked in parallel with each combination containing reflective elements of different curvature. The total system may produce images at twelve discrete distances, and the system may produce a distance continuum by illuminating adjacent combinations with different optical power ratios. Switches or other elements select the amount of power delivered to each layer in the overall stack.

The Magic Leap design presents a number of challenging design issues that has prevented the completion of a working prototype. First, the stacked layers of coupling-waveguide tube combinations prove challenging and quite difficult and costly to produce. One such stack may require manufacturing of multiple tubes, each with multiple reflective elements, and each layer of tubes requiring a different curvature for the reflective elements. Second, the size of one such stack, coupled with the need to produce a separate stack for each color to produce an RGB image, may cause the size and weight of the display to grow rapidly. The thickness of the display may exceed that of either the Hololens or Lumus displays. Third, little information exists on the method for implementing layer selection and distribution of power amongst the layers, leaving a number of design challenges unsolved based on the present information available. Fourth, light from one layer must pass through one or more other layers as the light travels to the eye, which raises the possibility of cross-talk and scattering issues that may likely degrade image quality.

As such, there exists a need within the art for a low cost, lightweight and broad FOV optical display system to realize the potential of AR and/or VR systems.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the present disclosure. Further, in the appended drawings, like or identical reference numerals or letters may be used to identify common or similar elements, and not all such elements may be so numbered. The figures are not necessarily to scale, and certain features and certain views of the figures may be shown as exaggerated in scale or in schematic in the interest of clarity and conciseness. Various dimensions shown in the figures are not limited to those shown therein and are only intended to be exemplary.

DETAILED DESCRIPTION

Figure 1:
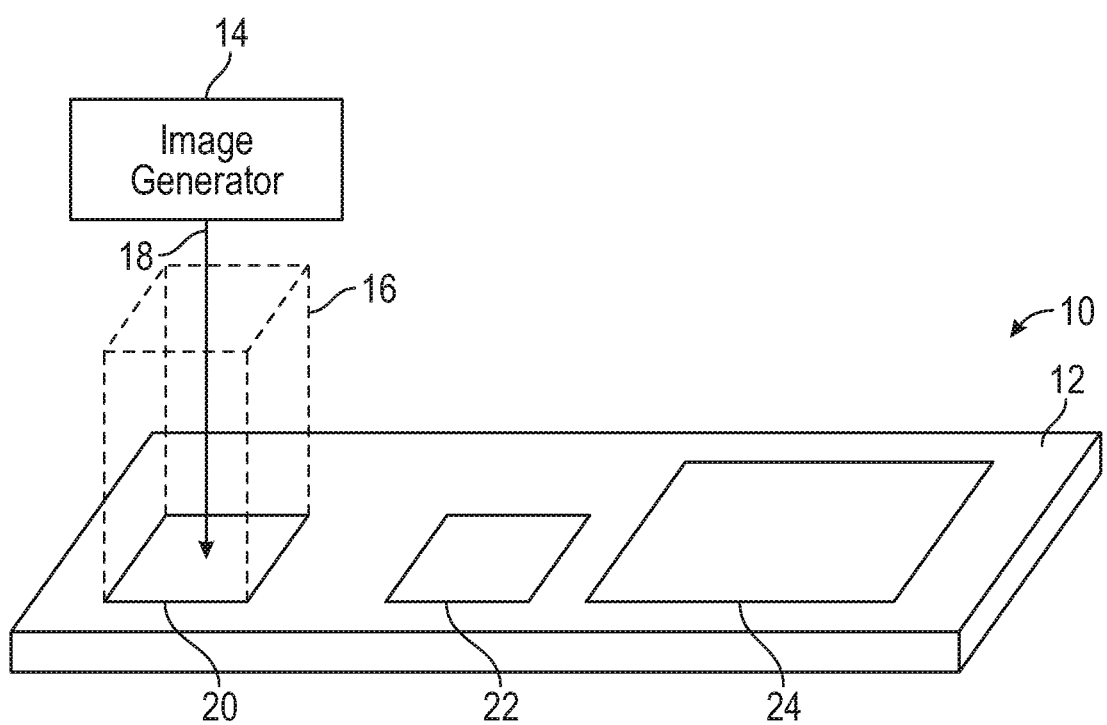
FIG. 1 is block diagram of an exemplary optical display system of the present disclosure.

The present disclosure describes an optical display system for use in augmented reality systems and/or virtual reality systems. Generally, the optical display system may maximize coupling of light from an image generator to an optical waveguide, include image magnification (e.g., exit pupil expansion) and wavelength dispersion correction over short distances to minimize size and/or weight of the optical display system, out-couple light substantially equally at most or all wavelengths over a significant area and range of angles to achieve a field of view (FOV) greater than 30 degrees, greater than 40 degrees, greater than 50 degrees, greater than 60 degrees, and/or provide beam divergence to provide natural eye accommodation. In some embodiments, the optical display system may include electrical and/or software components for driving image generators.

In some embodiments, the optical display system may provide three-dimensional, two-dimensional, convergence corrected, and/or full-color images to a user while minimizing size and/or weight of the optical display system. In some embodiments, the optical display system may use only a single waveguide to expand and/or direct light from an image generator to a user's eyes. A combination of diffractive elements may provide beam expansion within short distances and/or correction of chromatic aberrations within the optical display system to provide a sharp image with a wide FOV. Output couplers may provide additional enhancement of the FOV in some embodiments. A variable optical element may change divergence of the beam that reaches the output couplers, allowing the optical display system to change perceived distance of an object from the user and provide substantially correct convergence to ensure natural viewing by the user. A refractive optical element may provide images at different angles from an optical axis, as well as different distances from an output plane of the lens. A multi-layer diffractive optical element may provide wavelength dispersion of opposite sign.

Before describing various embodiments of the present disclosure in more detail by way of exemplary descriptions, examples, and results, it is to be understood that the embodiments of the present disclosure are not limited in application to the details of systems, methods, and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features that are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims and/or the specification is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, AGB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error that exists among the study subjects. Further, in this detailed description, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Further, an embodiment having a feature characterized by the range does not have to be achieved for every value in the range, but can be achieved for just a subset of the range. For example, where a range covers units 1-10, the feature specified by the range could be achieved for only units 4-6 in a particular embodiment.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Figure 2A:
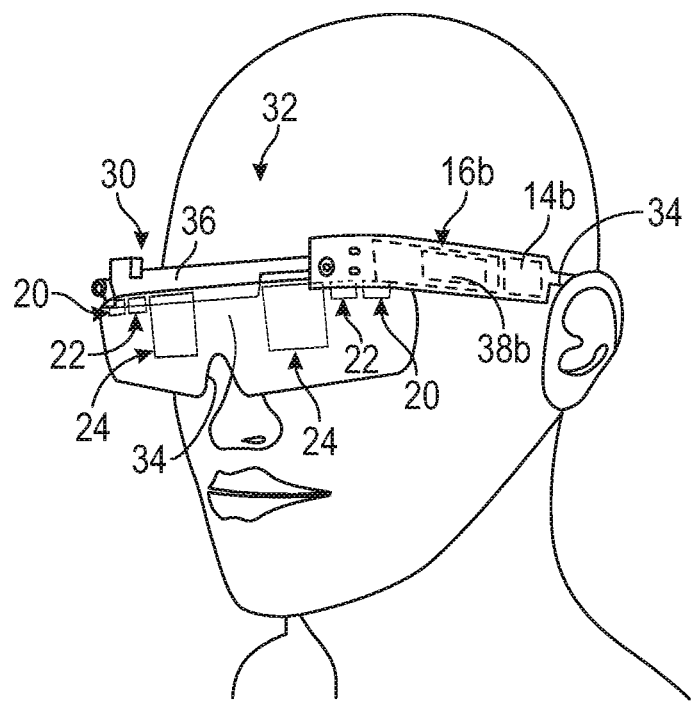
FIGS. 2A, 2B and 2C are perspective views of exemplary optical display systems of the present disclosure.
Figure 2B:
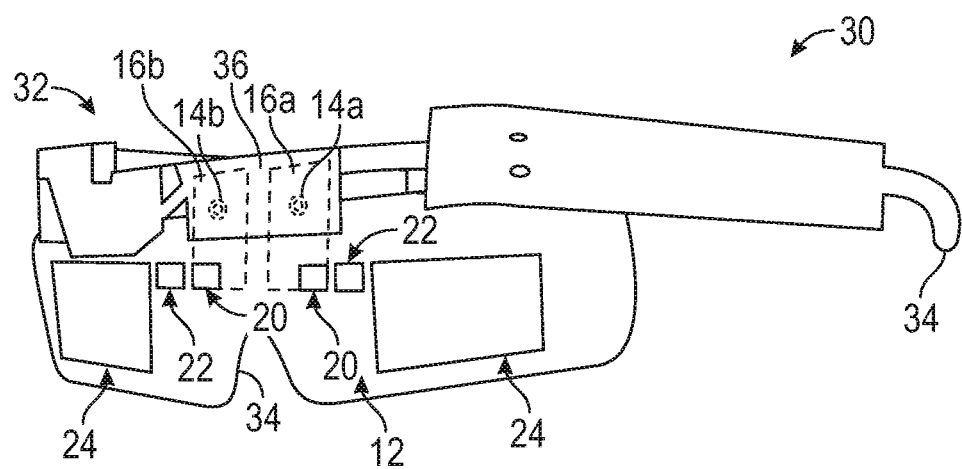
Figure 2C:
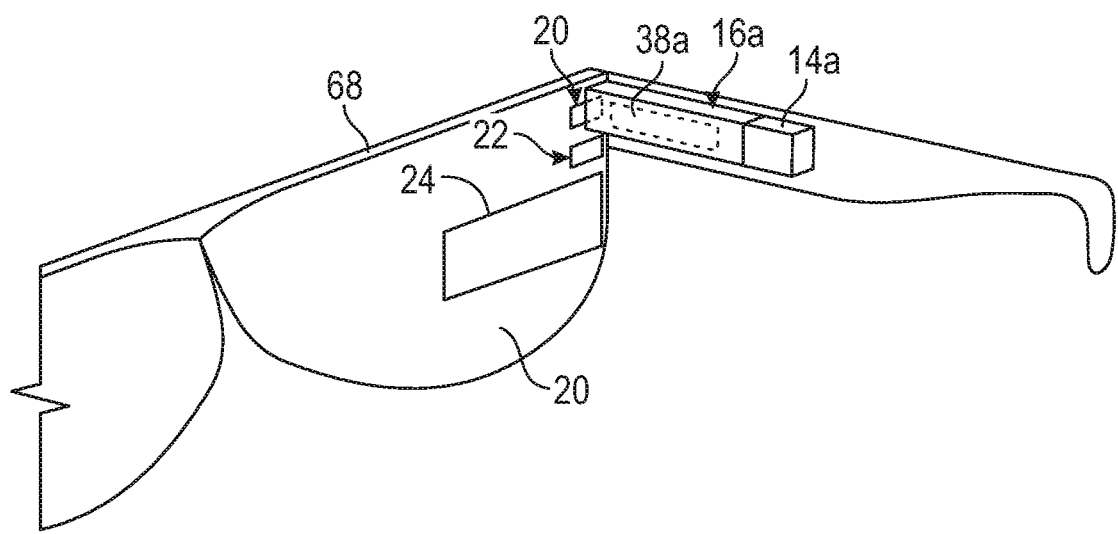

Referring to the Figures, and in particular to FIGS. 1 and 2A-2B, illustrated are optical display systems 10 for providing three-dimensional, two-dimensional, convergence corrected images to a user. Images may be full-color images, limited color images, grayscale images, and/or black and white images. Generally, the optical display system 10 may couple one or more images into an optical waveguide 12. It should be noted that images may include still images, video, animation, and/or the like. Additionally, the optical display system 10 may be configured to magnify the image in a horizontal direction and/or horizontal and vertical directions without producing any or minimal wavelength separation and/or distortion of the one or more images. To that end, the optical display system 10 may include one or more diffraction enhanced imaging systems 16 configured to collect one or more rays 18 produced by the image generator 14 (e.g., DLP projector, LCD display system, LCOS display system, GLV system, fiber controlled display system, and/or the like). The diffraction enhanced imaging system 16 may control convergence angle of each of the rays 18 at each wavelength (e.g., red, green, blue) prior to coupling each of the rays 18 into the optical waveguide 12. One or more in-coupling diffraction systems 20 may use diffraction to couple the incoming rays 18 into the optical waveguide 12 at specific convergence and/or divergence angles needed by subsequent systems to produce an expanded beam having specific final divergence angles. Within the optical waveguide 12, one or more wavelength compensated beam expanders 22 configured to simultaneously expand horizontal extension of the image (i.e., horizontal magnification), and/or compensate for wavelength dispersion such that color components of each image pixel may overlap precisely at one or more output coupling and vertical expansion systems 24. The output coupling and vertical expansion system 24 may be configured to magnify the image in a vertical direction and/or to direct a fraction of light towards the user at specific angles to create a wide FOV. It should be noted that via rotation of the optical display system 10, horizontal movement may become vertical and vertical movement may become horizontal. FIG. 2C illustrates an exemplary vertical arrangement of the optical display system 10.

In some embodiments, an adjustable optical element may be configured to control apparent distance at which the object appears such that the eye's convergence and accommodation system may work in concert, resulting in reduced fatigue and disorientation. One or more of the wavelength compensated beam expanders 22 may contain adjustable components that maintain the overlap of the color components of each image pixel for different configurations of the adjustable optical element. Other systems, as described herein, may control and/or coordinate generation of one or more images, track user movement (e.g., determine user directed attention), track user's eyes movement, map external surroundings, and/or the like.

Details and possible embodiments of the optical display system 10 and each of the diffraction enhanced imaging system(s) 16, in-coupling diffraction system(s) 20, wavelength compensated beam expander(s) 22, and output coupling and vertical expansion system(s) 24 are herein described.

In some embodiments, the optical display system 10 may be housed in a headset 30 as illustrated in FIGS. 2A and 2B. The headset 30 may include a frame 32. In some embodiments, the frame 32 may include one or more portions 34 configured to rest on a nose and/or ears of a user. In some embodiments, the frame 32 may include a band (not shown) configured to secure the headset 30 to a user's head. For example, the band may be an elastic band configured to secure the headset 30 to the user's head. In some embodiments, the frame 32 may be mounted within a helmet (not shown) configured to be positioned on a user's head.

Referring to FIGS. 2A and 2B, in some embodiments, the frame 32 may include a front support element 36. Two or more image generators 14 may be spatially disposed and positioned on the front support element 36. Each image generator 14 may be configured to provide a separate image to each eye. For example, a first image generator 14a may be configured to provide a first image to a left eye of a user and a second image generator 14b may be configured to provide a second image to a right eye of the user. In FIG. 2A, the image generators 14a and 14b are illustrated as positioned adjacent to temples of a user on the frame 32. In FIG. 2B, the image generators 14a and 14b are illustrated as positioned at the bridge of a nose of a user on the frame 32.

Figure 3:
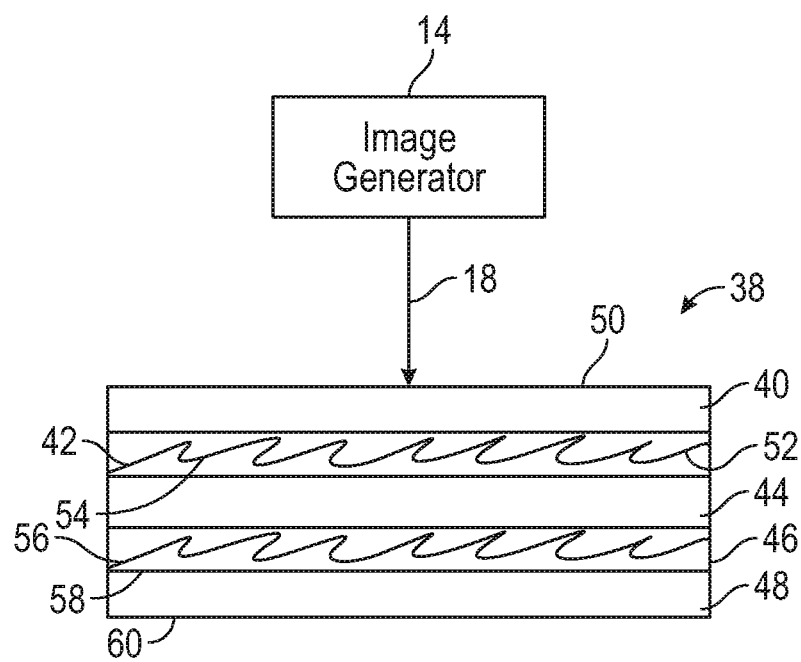
FIG. 3 is a block diagram of an exemplary diffraction enhanced optical imaging system for use in the optical display system illustrated in FIG. 1.

Referring to FIGS. 1 and 2A-2B, the diffraction enhanced imaging system 16 includes a plurality of lens 38 (designated by way of example as 38a and 38b in FIG. 2A and 2B) positioned in the frame 32 with the lens 38a such that an image may be substantially aligned with one of the user's eyes and the lens 38b such that an image may be substantially aligned with the other one of the user's eyes. Generally, the lens 38 includes both diffractive and refractive portions configured to alter wavelength dispersion effects on the image distance produced by the lens 38. Referring to FIG. 3, the lens 38 may include multiple layers including, but not limited to, a first substrate layer 40, a first diffractive grating layer 42, a spacer layer 44, a second diffractive grating layer 46, and a second substrate layer 48.

The first substrate layer 40 may be formed of glass and/or other optically clear (e.g., transparent) material having known wavelength dispersion properties. The first substrate layer 40 may include a first surface 50 and a second surface 52. The first surface 50 and/or the second surface 52 may be curved. Alternatively, the first surface 50 and/or the second surface 52 may be substantially flat. In some embodiments, at least one of the first surface 50 and the second surface 52 may be curved, such as, for example, the second surface 52 as illustrated in FIG. 3.

Referring to FIG. 3, the lens 38 may include the first diffractive grating layer 42 positioned adjacent to the second surface 52 of the first substrate layer 40. The first diffractive grating layer 42 may include at least one grating 54 formed of a holographic or surface-contained periodic modulation of the optical refractive index or surface height, respectively. In some embodiments, a bulk material substantially similar in index and clarity with materiality of the optical waveguide 12 may be used to write the gratings 54.

Period of the grating 54 of the first diffractive grating layer 42 may impact wavelength dispersion, both magnitude and sign, of the light generated by the one or more imaging generators 14. Grating 54 may aid in a higher coupling efficiency as compared to other prior art coupling methods.

Higher coupling efficiency may translate into lower power requirements at input and/or brighter images presented to a user.

Referring to FIG. 3, the lens 38 may also include a spacer layer 44. The spacer layer 44 may occupy space between the first diffractive grating layer 42 and the second diffractive grating layer 46. In some embodiments, the spacer layer 44 may be formed of optically clear (e.g., transparent) material to light in the visible spectrum, for example. In some embodiments, a portion or the entirety of the spacer layer 44 may include air. The refractive index of the spacer layer 44 may impact diffraction properties of the first diffractive grating layer 42 and/or the second diffractive grating layer 46.

The second diffractive grating layer 46 may be positioned adjacent to the spacer layer 44. In some embodiments, the second diffractive grating layer 46 may be formed of substantially similar material and properties as the first diffractive grating layer 42. The second diffractive grating layer 46 may include at least one grating 56 formed of a holographic or surface-contained periodic modulation of the optical refractive index or surface height, respectively. Period of the grating 56 of the second diffractive grating layer 46 may impact wavelength dispersion, both magnitude and sign, of the light generated by the imaging generator 14. Generally, grating variation with position may complement variation of the first diffractive grating 42. For example, in a surface-etched grating, peaks of the grating 56 of the second diffractive grating layer 46 may lie at substantially the same position as valleys of the grating 54 of the first diffractive grating layer 42.

The second substrate layer 48 may be positioned adjacent to the second diffractive grating layer 46. The second substrate layer 48 may be formed of glass and/or other optically clear material having known wavelength dispersion. In some embodiments, dispersion magnitude and/or sign of the second substrate layer 48 may be different than dispersion magnitude and/or sign of the first substrate layer 40. The second substrate layer 48 may include a first surface 358 and a second surface 60. The first surface 358 and/or the second surface 60 may be curved. Alternatively, the first surface 58 and/or the second surface 60 may be substantially flat. In some embodiments, at least one of the first surface 53 and the second surface 60 may be curved, such as, for example, the second surface 60 as illustrated in FIG. 3.

Figure 4:
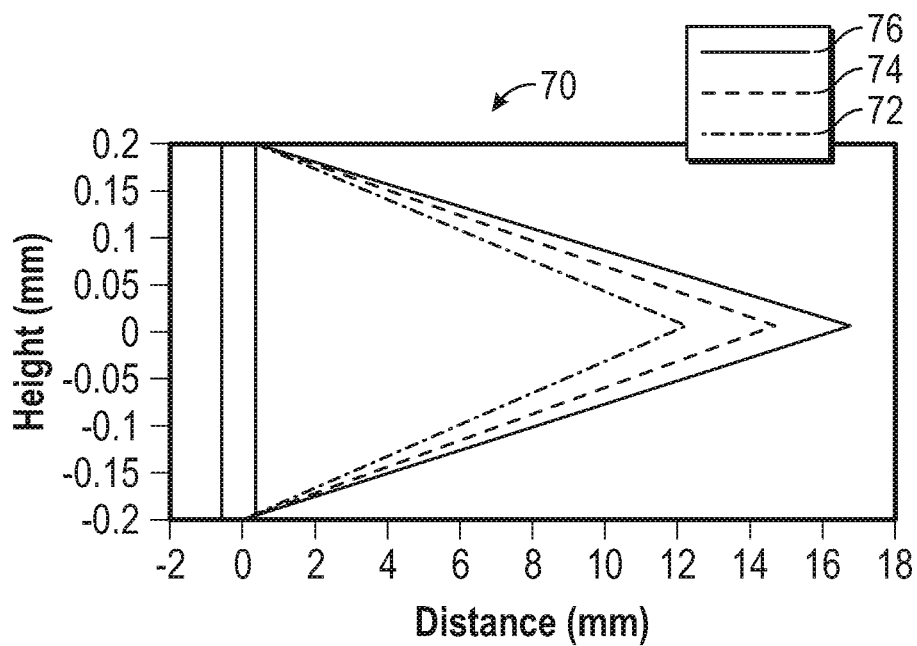
FIG. 4 is a graphical representation of example output of an exemplary embodiment of the diffraction enhanced optical imaging system illustrated in FIG. 3.

In some embodiments, at least one of the first substrate layer 40, first diffractive grating layer 42, spacer layer 44, second diffractive grating layer 46, and second substrate layer 48 may consist of one or more materials having a refractive index configured to be controlled by application of an electric field (e.g., via applied voltage). Changing the refractive index of the material may alter either or both refractive properties and diffractive properties of the lens 38 thus altering image distances and/or corresponding convergence or divergence of rays exiting the lens 38, FIG. 4 illustrates an example of a graph 70 of an exemplary output of an exemplary embodiment of the lens 38. Generally, magnitude of the difference in focal length between red wavelength 72, green wavelength 74 and blue wavelength 76 may depend on wavelength dispersion of materials used in each layer of the lens 38. In the exemplary embodiments illustrated in FIG. 4, a first material may have a change in refractive index of 0.013364 between the red wavelength 72 and the blue wavelength 76, and a second material may have a refractive index change of 0.027 between the red wavelength 72 and the blue wavelength 76.

Figure 5:
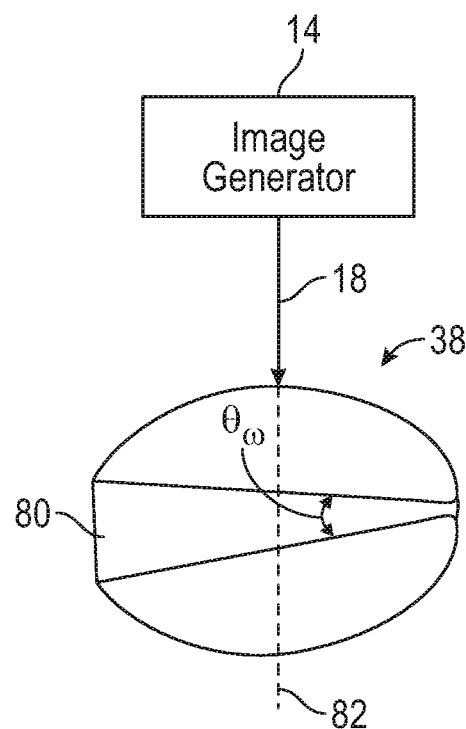
FIG. 5 is a block diagram of another exemplary diffraction enhanced optical imaging system for use in the optical display system illustrated in FIG. 1.
Figure 6:
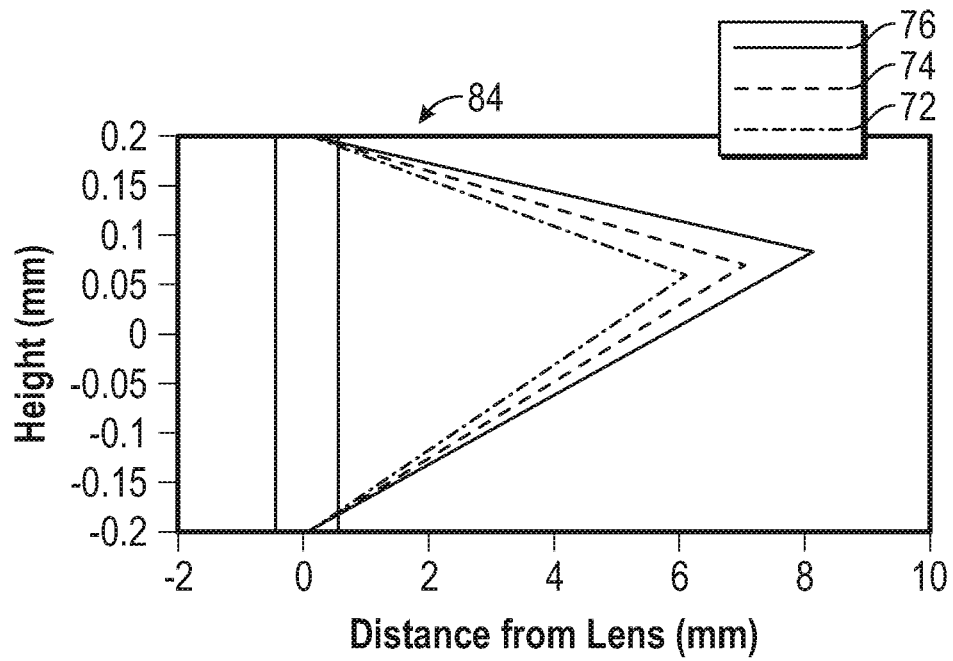
FIG. 6 is a graphical representation of example output of an exemplary embodiment of the diffraction enhanced optical imaging system illustrated in FIG. 5.

In some embodiments, the lens 38 may further include a refractive optical element and/or wedge element 80 as illustrated in FIG. 5. The wedge element 80 may be configured to provide images at different angles from an optical axis 82, as well as different distances from an output plane of the lens 38. The wedge element may be placed within the layers of the lens 38 as shown in FIG. 5, before lens 38 (between the image generator 14 and the front layer 50 of first substrate 40), or after lens 38 (beyond the second layer 60 of second substrate 48) and prior to waveguide 12. Referring to FIGS. 5 and 6, the wedge element 80 may create a 0.57 degree tilt in an imaging axis for blue wavelengths 76, but only a 0.548 degree tilt in the imaging axis for red wavelengths 72, for example, as shown in graph 84 illustrating output of the lens 38 having the wedge element 80. The wedge angle $\Theta_W$ may be determined to achieve a pre-determined angle in output rays and/or imaging axes. In some embodiments, wedge angle $\Theta_W$ may be determined and/or dependent on materiality of the wedge element 80, focal length of the lens 38, and/or focal power of the lens 38. In some embodiments, the wedge angle $\Theta_W$ may be up to 10 degrees, for example. As a result, light at different wavelengths 72, 74 and 76 may enter the in-coupling diffraction system 20 (shown in FIG. 1) at different angles and/or different positions.

Figure 7A:
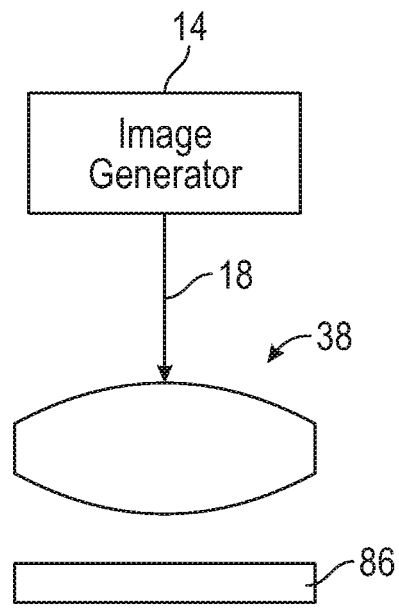
FIG. 7A is a block diagram of another exemplary diffraction enhanced optical imaging system for use in the optical display system illustrated in FIG. 1.

Referring to FIGS. 1 and 7A, in some embodiments, a second refractive element 86 may be positioned adjacent to but spaced a distance away from the lens 38. In some embodiments, the second refractive element 86 may be a variable focal length lens configured to modify divergence of rays exiting the lens 38. The second refractive element 86 may be, for example, a liquid-based variable focal length lens and/or other refractive element capable of modifying divergence of rays exiting the lens 38.

Figure 7B:
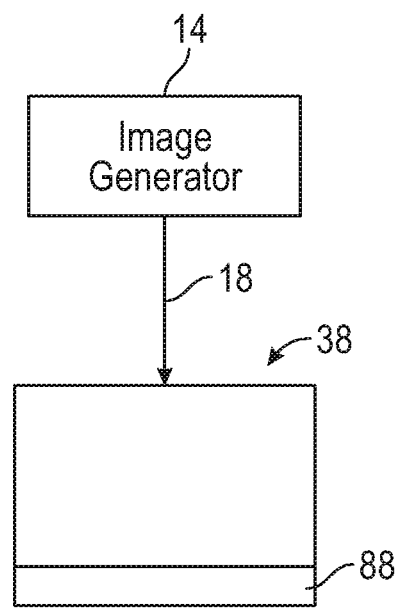
FIG. 7B is a block diagram of another exemplary diffraction enhanced optical imaging system for use in the optical display system illustrated in FIG. 1.

Referring to FIGS. 1 and 7B, in some embodiments, a refractive element 88 may be positioned adjacent to and in contact with the lens 38. The refractive element 88 may be, for example, one or more lens formed of dispersive material to counteract and/or enhance wavelength dispersion of the lens 38 to increase or decrease wavelength dispersion of the optical display system 10. In some embodiments, the refractive element 88 may be formed of material having a refractive index more strongly dependent on wavelength than standard optical glasses (e.g., BK7), in that the material has a greater change in refractive index as a function of wavelength than standard glasses, for example.

Figure 8A:
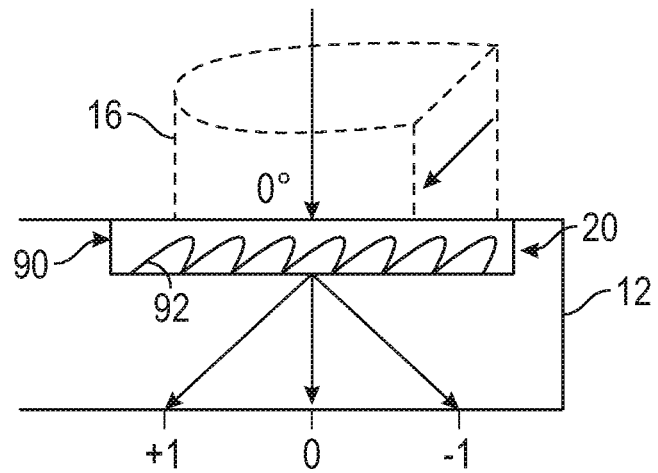
FIG. 8A is a block diagram of an exemplary in-coupling diffraction element for use in the optical display system illustrated in FIG. 1.

Referring to FIGS. 1 and 8A, the in-coupling diffraction system 20 redirects light incident on the diffraction enhanced imaging system 16 into a different direction of travel such that light may propagate in a guided way along a length of the optical waveguide 12. In some embodiments, the in-coupling diffraction system 20 may include a single diffraction grating 90. Using the single diffraction grating 90 may further reduce size of the in-coupling diffraction system 20 and reduce manufacturing and complexity cost. Period of the single diffraction grating 90 may be selected such that rays entering the single diffraction grating 90 from the diffraction enhanced imaging system 16 exit the single diffraction grating 90 at angles conducive to propagation within the optical waveguide 12 by total internal reflection (TIR). Period of the single diffraction grating 90 may also alter ray cone for each wavelength to create a new image point, either virtual or real, that may act as an input image for the wavelength compensated beam expander 22 (shown in FIG. 1).

Gratings 92 in the single diffraction grating 90 may affect light entering normal to the optical waveguide 12, simplifying and/or minimizing size of optics between the image generator 14 and the optical waveguide 12. In some embodiments, period of the single diffraction grating 90 may be selected to modify (i.e., enhance or reduce) wavelength dispersion introduced by the diffraction enhanced imaging system 16. The single diffraction grating 90 may contain blazing and/or other design configured to couple energy into forward propagating direction (i.e., either positive $1^{st}$ order or negative $1^{st}$ order diffraction) minimizing loss of optical power during coupling. Blazing is altering symmetry of each period of the grating 92 to support constructive interference in one direction and/or angle out of the grating 92 and/or create strong destructive interference in other angles at which the grating 92 may attempt to diffract light. Depth and length of the grating 92 may also influence coupling efficiency, and may be selected to maximize power coupled into desired diffraction order without making grating complicated or costly to manufacture. The gratings 92 may consist of either a holographic (index-based) grating, alternating materials of different refractive index in a periodic manner over distance, dynamic diffractive elements, subwavelength diffractive elements, and/or an amplitude grating (periodic surface structure).

For the structure of the gratings 92, parameters may include modulation period ($\wedge\wedge_g$), depth of modulation, and shape of function within each modulation period. Referring to FIG. 8A, illustrated therein is light passing through the single diffraction grating 90 having gratings 92. Some portion of the light does not diffract (m=0 or $0^{th}$ order), and fractions of the optical power diffract primarily into two first order beams (m=±1), each exiting at angle $\Theta_d$ that depends on $\wedge\wedge_g$ and wavelength λ, according to the equation:

$$\theta_d = \sin^{-1}\left(\frac{m\lambda}{\Lambda_g} + \sin(\theta_{in})\right) \quad \text{(EQ. 1)}$$

wherein $\Theta_{in}$ is the angle of the incoming light with respect to the grating normal, which equals zero for base design of the optical display system 10. A greater depth of modulation generally increases the coupling efficiency which determines the fraction of incident power directed into first-order beams. Functional shape within each period of the gratings 92 may also influence diffraction efficiency for two first-order beams. A sinusoidal shape couples power equally into first order beams. As illustrated in FIG. 8A, power entering the −1 order may not travel to the user's eye, and thus may represent a loss in the optical display system 10. Altering shape of variation, including blazing, from sinusoidal to some other shape may diffract power into the +1 order and significantly weaken coupling into the −1 order, increasing power delivered to the user's eye and increasing in-coupling efficiency. Length of grating 92 and positioning of the image generator 14 along length of the grating 92 may also influence diffraction efficiency.

Figure 8B:
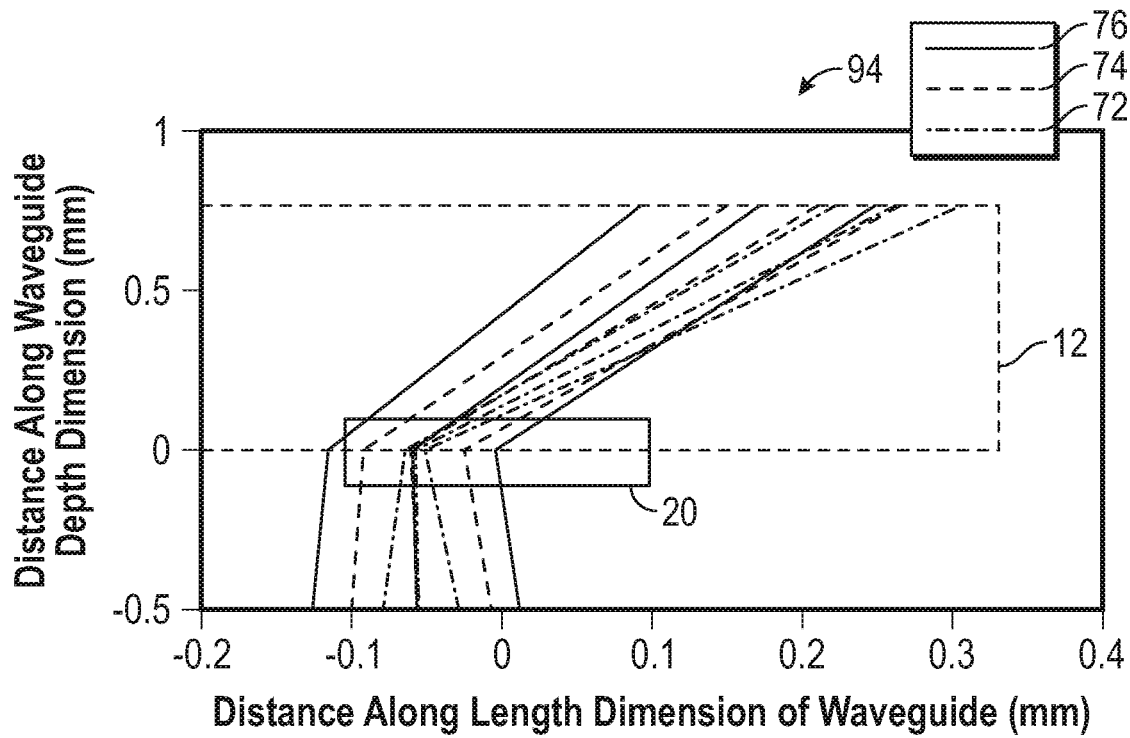
FIG. 8B is a graphical representation of example output of an exemplary embodiment of the in-coupling diffraction element illustrated in FIG. 8.

FIG. 8B illustrates a graph 94 of a result of an exemplary embodiment of the in-coupling diffraction system 20 having a grating period of 1.648 μm. Rays diffract away from the in-coupling diffraction system 20 in diffraction directions and at different divergences for each of the three wavelengths.

Distance between the diffraction enhanced imaging system 16 and the in-coupling diffraction system 20 may be configured to aid in propagation of the light. The distance may determine width of the beam of light for each color at the input plane of the in-coupling diffraction system 20, and the difference in location of where the center of the beams intercept the in-coupling diffraction system 20. In some embodiments, both beam width and beam axis location at the single diffraction grating 90 may be selected such that the resulting beams of light for each of the wavelengths have substantially similar width and beam axis when exiting the wavelength compensated beam expander 22. In the exemplary embodiment illustrated in FIG. 8B, the single diffraction grating 90 was positioned at a distance of 5.865 mm from the diffraction enhanced imaging system 16.

Figure 9A:
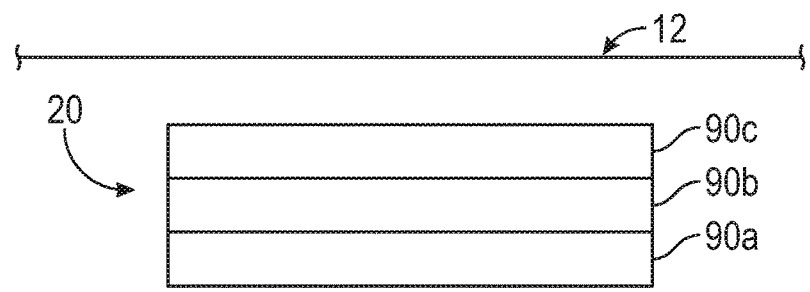
FIGS. 9A and 9B are block diagrams of exemplary in-coupling diffraction elements for use in the optical display system illustrated in FIG. 1.
Figure 9B:
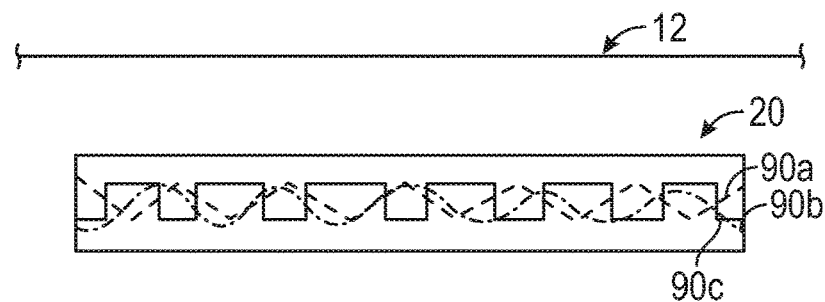

Referring to FIGS. 9A and 9B, in some embodiments, the in-coupling diffraction system 20 may include multiple diffraction gratings 90 with each grating tuned to one of the three RGB colors such that each independently controls imaging properties of each wavelength. In some embodiments, multiple gratings may include three spatially distinct diffraction gratings 90a, 90b and 90c as illustrated in FIG. 9A. Each diffraction grating 90a, 90b and 90c may be layered one behind the other, with angular output of each grating chosen to compensate for the difference in depth from which each output may be generated. In some embodiments, multiple gratings 90a, 90b and 90c may be formed within the same material as illustrated in FIG. 9B. The gratings 90a, 90b and 90c may be superposed on one another, minimizing depth and/or thickness of the in-coupling diffraction system 20 and subsequent optical waveguide 12. In some embodiments, each may include a sinusoidal pattern having a different period and/or frequency.

Figure 10:
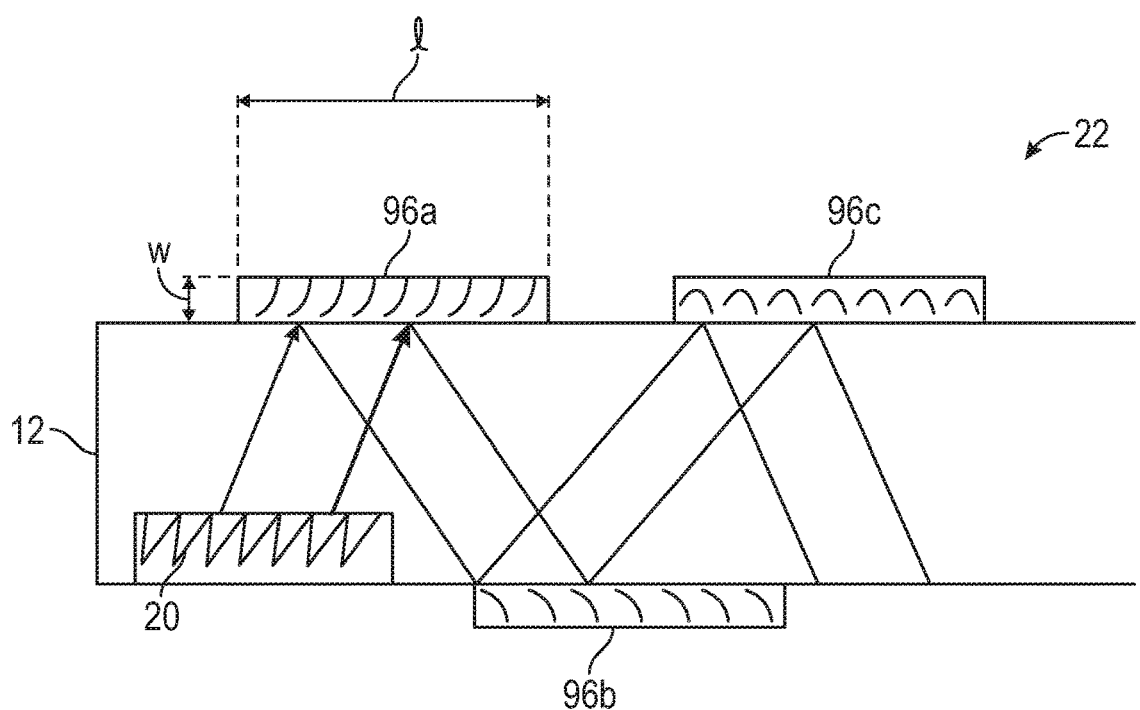
FIG. 10 is a block diagram of an exemplary wavelength compensated beam expander for use in the optical display system illustrated in FIG. 1.

Referring to FIGS. 1 and 10, images from the in-coupling diffraction system 20 may be propagated towards the wavelength compensated beam expander 22. The wavelength compensated beam expander 22 may provide an output image that contains magnification in a horizontal direction and/or corrects for wavelength dispersion such that color components of each pixel spatially overlap. Within the optical waveguide 12, the wavelength compensated beam expander 22 may include one or more optical elements 96 configured to simultaneously expand horizontal extension of the image (i.e., horizontal magnification), and/or compensate for wavelength dispersion such that color components of each image pixel may overlap precisely at one or more output coupling and vertical expansion systems 24. Generally, diffracted light from in-coupling diffraction system 20 may strike each optical element 96 in series, with the divergence and/or wavelength dispersion properties being altered at each optical element 96. In some embodiments, at least two of the optical elements 96 may be configured as curved mirrors and/or the like. The optical elements 96 may alter the beam width based on relative focal lengths of each optical element 96 and/or distance traveled between each optical element 96.

The wavelength compensated beam expander 22 receives images formed by the in-coupling diffractive system 20 at each wavelength. Light from the image may either directly illuminate a first optical element 96a or illuminate the first optical element 96a after one or more reflections within the optical waveguide 12, depending on design of the first optical element 96a and/or needs of the application. The first optical element 96a may produce a subsequent image, one for each wavelength, via diffraction and/or reflection, and may provide corrective action to reduce wavelength dispersion introduced by the diffraction enhanced imaging system 16 and the in-coupling diffractive system 20. The image produced by the first optical element 96a may act as the input to the second optical element 96b. Light from the image produced by the first optical element 96a may either directly illuminate the second optical element 96b or may illuminate the second optical element 96b after one or more reflections within the optical waveguide 12. The design of the second optical element 96b may produce images at infinity (i.e., collimated light) for each wavelength under initial design conditions, with the position and propagation direction (i.e., angle) of each output beam overlapping and coinciding with that of the beams for the other wavelengths.

For both the first optical element 96a and the second optical element 96b, thickness of the optical waveguide 12 may determine the effective object distances for the elements. Distance of the object combined with design of each optical element 96a and 96b may determine the distance of the image for each wavelength. Further, selection of thickness for the optical waveguide 12 may allow for objects and images to appear at distances in concert with diffractive nature of the first optical element 96a and the second optical element 96b to provide corrected final output properties for each of the wavelengths. Additional optical elements (e.g., 96c. . . 96n) may be used within the beam expander 22 and the output coupling and vertical expansion system 24.

Imaging properties of each optical element 96 may depend on effective shape of the optical element 96. For example, spherical shapes may produce greater distortion as compared to aspheric shapes. In some embodiments, an intermediate image may be produced between two optical elements 96. Depending on design, each optical element 96 may reduce or increase a difference in ray angles between wavelengths that occur due to in-coupling grating (e.g., wavelength dispersion). To minimize and/or eliminate wavelength dispersion and/or maximize image clarity, an additional optical element 96 (e.g., 96c. . . 96n) may be used within the beam expander 22. Such additional optical element 96 may be configured to compensate and/or correct for differences in ray angles among wavelengths. As such, beam expander 22 may produce a large lateral magnification in a short distance, provide a collimated output beam, and/or minimize wavelength dispersion artifacts in the image.

Each optical element 96 may include at least one of a reflective mirror 98, a single-axis Fresnel reflector 100, and a reflection grating 102.

Figure 11A:
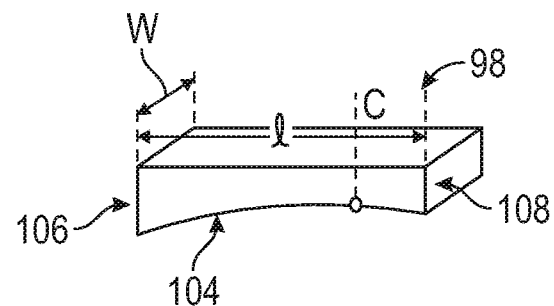
FIGS. 11A-11C are block diagrams of exemplary optical elements for use in the wavelength compensated beam expander illustrated in FIG. 10.

Referring to FIG. 11A, the reflective mirror 98 may include a first surface 104. In some embodiments, the first surface 104 may be a curved surface. For example, the first surface 104 may be spherical, aspheric, and/or the like. In some embodiments, curvature of the first surface 104 may be dependent on function of the optical element 96. The reflective mirror 98 may include a first end 106 and a second end 108. In some embodiments, the first end 106 and/or the second end 108 may be truncated such that a vertex is offset from center C of the reflective mirror 98. With the vertex offset from center C, output angles may be adjusted for the reflected beam. Width w and length I of the reflective mirror 98 may be sufficient to intercept all or substantially all incoming light rays to minimize optical loss at the optical element 96.

Figure 11B:
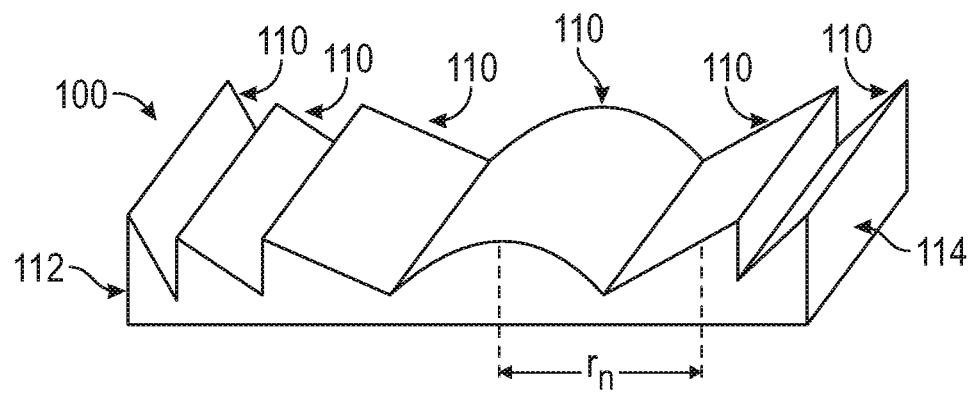

Referring to FIG. 11B, the single-axis Fresnel reflector 100 may embody the concept of Fresnel zones to provide imaging along only one axis and/or direction. Fresnel reflectors 100 create effects of a curved surface by slicing the surface into rings (two-dimensional) or strips (one-dimensional) and placing such rings or strips in a flat plane. The one-dimensional configuration may alter beam width along only one axis. Constructive and destructive interference between light rays reflected from each strip may effectively focus or defocus optical power in the incident beam.

Size of each Fresnel zone 110 in the Fresnel reflector 100 may be determined by effective focal length for the optical element 96 and/or wavelength for which desired effective focal length may be achieved. Center of each Fresnel zone 110 of the Fresnel reflector 100 may be determined using the following equation:

$$r_n = \sqrt{n\lambda f + \frac{n^2\lambda^2}{4}} \qquad \text{(EQ. 2)}$$

wherein $r_n$ is the distance from the center of the Fresnel reflector 100 to the center of the $n^{th}$ Fresnel zone, n is a positive integer, f is the desired focal length of the Fresnel reflector 100, and $\lambda$ is the design wavelength. The design wavelength may be selected to achieve specific values of wavelength dispersion (e.g., variation in value of f as a function of wavelength) to counteract, in part or in whole, dispersion generated by the diffraction enhanced imaging system 16 and the in-coupling diffractive system 20. Width and length of the optical element 96 may be sufficient to intercept all incoming light rays in order to minimize optical loss at the optical element 96. The Fresnel reflector 100 may be constructed with the n=0 zone positioned less than halfway between a first edge 112 and a second edge 114 of the Fresnel reflector 100. Such positioning may obtain one or more desired output angles for reflected beams by having light from each wavelength strike the Fresnel reflector 100 at different positions, and as such, different effective curvature thus changing the direction of the $0^{th}$ order reflection.

Figure 11C:
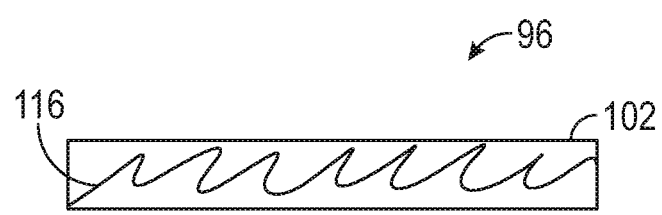

Referring to FIG. 11C, in some embodiments, the optical element 96 may include the reflection grating 102. The angle of reflection from the reflection grating 102 may be dependent on gratings 116 causing a reflected angle in a nonlinear manner, and as such, may alter divergence/convergence point of a cone of rays effectively changing location of the image with respect to the next optical element (e.g., 96b). The change in location of the image may depend on the wavelength, and as such, the reflective grating 116 may alter and/or compensate for wavelength dispersion. Other factors influencing reflection angle may include, but are not limited to, period of the grating, use of blazing to diffract light into a specific diffraction order, and/or the like.

In some embodiments, the optical element 96 may be positioned on the exterior of the optical waveguide 12 as illustrated in FIG. 10. Light may pass through the optical waveguide 12 to the optical element 96. In some embodiments, space between the optical waveguide 12 and the optical element 96 may be filled with an optically clear material. The refractive index of the material maybe selected to reduce and/or eliminate total internal reflection at the wall of the optical waveguide 12 and/or minimize bending of rays passing through the optical waveguide 12 to the optical element 96. In some embodiments, the refractive index of the optically clear material may be substantially similar (a percent difference of less than 5%, for example) to the refractive index of the optical waveguide 12. In some embodiments, the material of the optically clear material may be an optical epoxy. In some embodiments, the material of the optically clear material may include adhesive properties such that the optical element 96 may be attached to the optical waveguide 12. In some embodiments, the optical element 96 may be attached using a separate adhesive material and/or structure.

In some embodiments, the space between optical waveguide 12 and the optical element 96 may be filled with a material possessing a refractive index controllable by an applied electric field. Applying an electric field, including but not limited to an applied voltage or current, may raise or lower the refractive index, depending on the properties of the material and polarity of the applied electric field. Raising or lowering the refractive index makes the refractive index of the material different from that of the optical waveguide 12, causing refractive bending of the light rays at the boundary between the material and the optical waveguide 12. Refractive bending may change the effective location and/or distance of the object for the optical element 96, thereby changing the imaging properties (divergence, image location and type) of the optical element 96 and thus changing the wavelength dispersion compensation achieved by the optical element 96. The change in wavelength dispersion compensation may allow the wavelength compensated beam expander 22 to correct for changes in the wavelength dispersion of the diffraction enhanced imaging system 16 resulting from changes in the second refractive element 86.

In some embodiments, a piezo electric material may be positioned as a spacer between the wall of waveguide 12 and the optical element 96. A voltage applied to the piezo electric material may cause the piezo electric material to expand or contract in size, subsequently causing the optical element 96 to move closer to or further away from wall of waveguide 12. In some embodiments, two or more piezo electric spacers may be used to change the tilt of the optical element 96. For example, the piezo electric spacer on one side may be directed to expand while the piezo electric spacer on the opposite side may be directed to contract, causing the optical element 96 to obtain a tilt with respect to the wall of waveguide 12, with the tilt oriented toward the side on which the piezo electric spacer expanded and oriented away from the side on which the piezo electric spacer contracted. The change in distance between optical element 96 and the wall of waveguide 12 may change the effective object distance between the prior image and the optical element 96, thereby changing the imaging properties (divergence, image location and type) of the optical element 96 and thus changing the wavelength dispersion compensation achieved by the optical element 96. The change in wavelength dispersion compensation may allow the wavelength compensated beam expander 22 to correct for changes in the wavelength dispersion of the diffraction enhanced imaging system 16 resulting from changes in the second refractive element 86.

In some embodiments, the optical element 96 may be formed within the wall of the optical waveguide 12. For example, in some embodiments, the wall of the optical waveguide 12 may be sculpted to a desired shape. The exterior surface of the optical waveguide 12 may then be coated with a reflective coating forming the optical element 96. The reflective coating may consist of a metal substance, for example, reflecting at each of the RGB wavelengths. Other coatings and/or implementation of the reflective coating, such as dielectric coatings, are contemplated that provide for equal reflection power at each of the RGB wavelengths.

Figure 12:
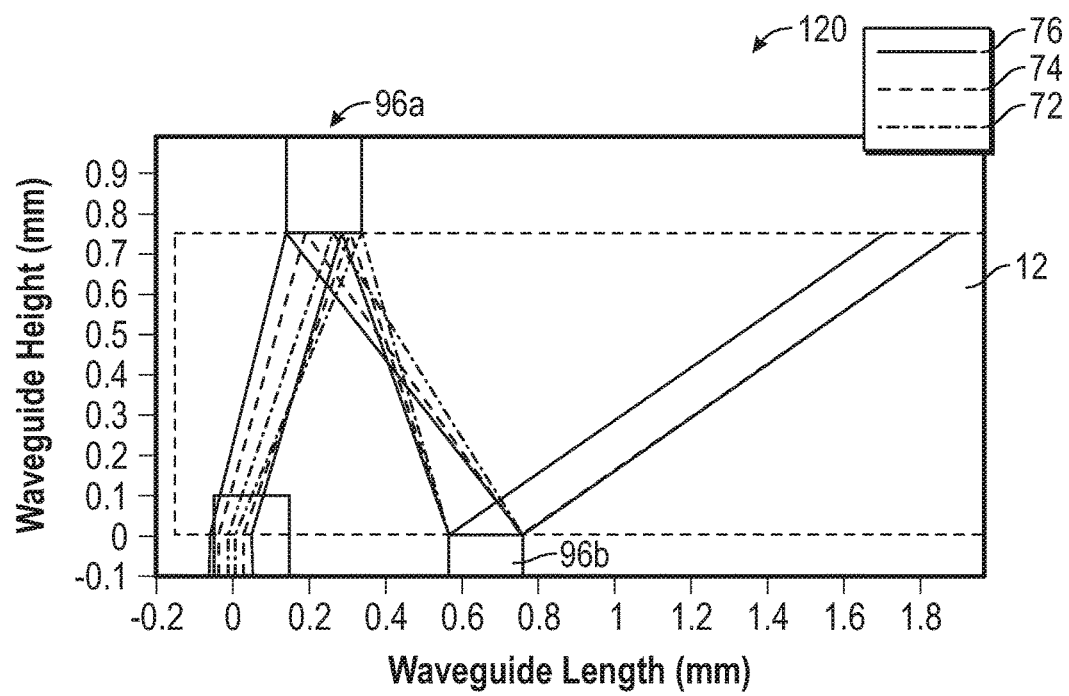
FIG. 12 is a graphical representation of example output of an exemplary embodiment of the wavelength compensated beam expander illustrated in FIG. 10.

FIG. 12 illustrates a graph 120 of output for an exemplary wavelength compensated beam expander 22 having at least one optical element 96 including the single axis Fresnel reflector 100. The single axis Fresnel reflector 100 may collect light and bring reflections to a focal point with the optical waveguide 12. In this example, the first optical element 96a has a focal length of 0.14 mm at a design wavelength of 665 nm, and the center of the first optical element 96a is positioned 2.2 µm from the central axis of the red wavelength 72. Other combination of thickness for the optical waveguide 12, focal length, design wavelength, and reflector center may potentially produce equal width beams at the second optical element 96b. Each wavelength may focus at a different distance and/or angle within the optical waveguide 12, and the width of beam at the input plane of the second optical element 96b (e.g., second single-axis Fresnel reflector 100) may be substantially equal for all wavelengths. The second optical element 96b may utilize a design providing collimated light at substantially all wavelengths and direction of wavelengths down the length at substantially the same angle. In some embodiments, small focal length (e.g., less than or equal to 0.1 mm), may be utilized and/or reflection from at least a section of the second optical element 96b off-center may be used. Off-centered reflection may provide less divergence in output beams, with less than 0.005 degrees of divergence shown in FIG. 12. The output angle provided may also produce total-internal reflection of all wavelengths about the walls of the optical waveguide 12.

Figure 13:
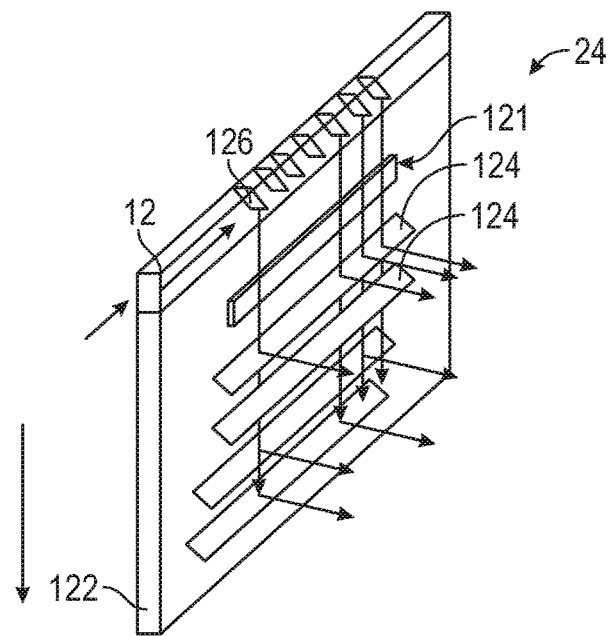
FIG. 13 is a block diagram of an exemplary output coupling and vertical expansion system for use in the optical display system illustrated in FIG. 1.

Referring to FIGS. 1 and 13, the output coupling and vertical expansion system 24 may magnify the image in a vertical direction creating a large output area (i.e., exit pupil). The output coupling and vertical expansion system 24 may include a vertically oriented waveguide 122 employing a vertical beam expanding element 121 and two or more reflecting elements 124 configured to magnify the exit pupil in a vertical direction and/or to direct a fraction of light out of the vertically oriented waveguide 122 and towards the user at specific angles to create a wide FOV. A large exit pupil, combined with the range of light angles entering the eye may produce the large total FOV. The FOV describes the range of angles over which the user may perceive the image generated by the optical display system 10, and may determine the size of viewing area for the user. A larger FOV may allow the user to observe scenes and objects over a larger range, reducing the need to turn the user's head to view images away from a center of vision and/or preventing objects from clipping or disappearing off edges of the images when looking at another object. After the image expands and propagates along the optical waveguide 12, a turning optic 126 may direct the image in a vertical direction as shown in FIG. 13. The turning optic 126 may consist of, but is not limited to, a mirrored surface, consisting of one or more discrete component surfaces deflecting light, or a distributed reflecting element, including but not limited to a long-period variation in the refractive index for which reflection rather than diffraction may be the predominant optical effect Fabry Perot Filters, and/or the like. Light propagation off of the turning optic 126 may then contain a component perpendicular to propagation along the optical waveguide 12.

After the turning optic 126 directs light to propagate along the vertical waveguide 122, the light enters a vertical beam expanding element 121 that expands the image along the vertical direction. The vertical beam expanding element 121 contains components that may be used to deflect light through a range of angles in the vertical direction. Such components may provide for rays to propagate at a faster rate as compared to other rays propagating solely in the vertical direction, and as such, the image may be expanded in the vertical direction. Components of the vertical beam expanding element 121 may include, but are not limited to, a wavelength compensated beam expander of similar composition to that of the wavelength compensated beam expander 22 in waveguide 12, one or more mirrors of which at least two must be curved, and/or TIR reflections between the walls of vertical waveguide 122. The vertical waveguide 122 may be similar in construction to the compensated beam expander 22. In some embodiments, a 45 degree deflection may be created in a vertical direction by turning optic 126 providing light to propagate between walls of the vertical waveguide 122 employing TIR.

In some embodiments, one or more of the components may possess the capability to change the image forming properties of the component through the application of an electric field. The components may possess structure similar to optical element 96 in the optical waveguide 12, including a material possessing a refractive index that varies with the application of an applied electric field and piezoelectric devices placed between the component and the wall of vertical waveguide 122. The change in image forming properties allows the vertical beam expanding element 121 to alter the divergence of the light traveling along vertical waveguide 122 which may change the perceived distance of an object from the viewer, either as an independent control or in combination with the second refractive element 86.

In some embodiments, the vertical waveguide 122 may be formed of an optically clear material having sufficiently high index of refraction to provide for total internal reflection over a wide range of incident angles. Potential materials include, but are not limited to, optical plastic, optical glass, and/or the like. For example, one or more optical plastics may be used to reduce cost and/or weight of the optical display system 10. Thickness of the vertical waveguide 122, angle of deflection created by the turning optic 126, and/or spacing of the reflecting elements 124 may determine magnification achieved between the turning optic 126 and the reflecting elements 124.

The reflecting elements 124 may be designed to direct a fraction of the optical power propagating within the vertical waveguide 122 towards a user's eye at a specific angle and/or specific divergence, independent of the wavelength incident on the reflecting elements 124. The reflecting element 124 may maintain color balance (ratio) in the original image due to its wavelength independent reflection properties. The reflecting element 124 may include, but is not limited to, a Fabry-Perot filter, a partially reflecting thin film element, and/or the like.

The Fabry-Perot filter may have low reflectivity at end surfaces and a sufficiently small distance between such end surfaces, such that the range of wavelengths between resonances of the filter exceeds the range between the blue and red wavelengths contained in the image projected by the image generator 14. Low reflectivity surfaces may increase transmission coefficient in a region between resonance wavelengths of the filter, thereby reducing the reflectance. Changing surface reflectivity subsequently may change the reflectance. To ensure that each reflector in the array delivers substantially similar (i.e., within a few percent and up to 20% difference, for example) optical power to the user, the reflectance may be configured to begin at a lower value for the first reflector and increase steadily for each subsequent reflector in the series chain, since the incident power on each subsequent reflector has been reduced by the reflecting operation of the previous reflector. The reflectance of the first reflector and each subsequent reflector depends on the number of reflectors. For example, in the case of four reflectors, the first reflector would reflect 0.25 of the incident light, the next reflector would reflect $\frac{1}{3}^{rd}$ of the remaining light transmitted through the first reflector, the third reflector would reflect 0.5 and the final reflector would reflect all incident light, resulting in each reflector directing $\frac{1}{4}^{th}$ of the original power to the user's eye. As the distance between the end surfaces decreases, the distance between resonant wavelengths increases, and the reflectance as a function of wavelength may closely approximate ((i.e., within a few percent and up to 20% difference, for example) a constant in the region between the resonant wavelengths, resulting in less wavelength dependence in the fraction of power reflected toward the user. The Fabry-Perot filter may consist of, but is not limited to, a material of different index than the surrounding waveguide inserted into the waveguide, an air gap created by slicing the waveguide and shifting one side of the slice a specified distance from the other slice, or slicing the waveguide at two nearly adjacent points, applying a reflecting thin film to the slice surfaces, and reassembling the sliced parts into a single waveguide.

The reflecting element 124 may also include a partially reflecting thin film element. The partially reflecting thin film element may be configured to obtain a given reflection coefficient at each wavelength. In some embodiments, the vertical waveguide 122 may be sliced with ends of the slices polished. A thin film may then be applied to each polished end with the vertical waveguide 122 splice together into a whole component.

The angle at which the reflecting element 124 deflects light toward the user may be determined by the angle of the reflecting element 124 with respect to the walls of the vertical waveguide 122 and with respect to the angle of propagation of the light within the vertical waveguide 122. In some embodiments, the angle of each reflecting element 124 may be configured to be different, such that each reflecting element 124 directs light into the user's eye from a different direction. For example, a first reflecting element 124 may directs light downward at a relatively steep angle, the second reflecting element 124 may direct light downward at a shallow angle, the third reflecting element 124 may direct light upward at a shallow angle, and the fourth reflecting element 124 may direct light upward at a relatively steep angle. As a further example, the reflecting elements 124 on the left side of vertical waveguide 122 may also possess some horizontal tilt, directing light back toward the right, and the reflecting elements 124 on the right side of vertical waveguide 122 may possess a different horizontal tilt directing light back toward the left. Varying the direction in such a way effectively increases the FOV by directing light from a large area of the vertical waveguide 122 (FOV is highly dependent on the emitting area) and increasing the range of angles at which light from the image reaches the eye (increases the FOV further, beyond that resulting from the size of the emitting area). Other orientations and positioning of the reflecting elements 124 along the vertical direction are possible, depending on the targeted application.

Figure 14:
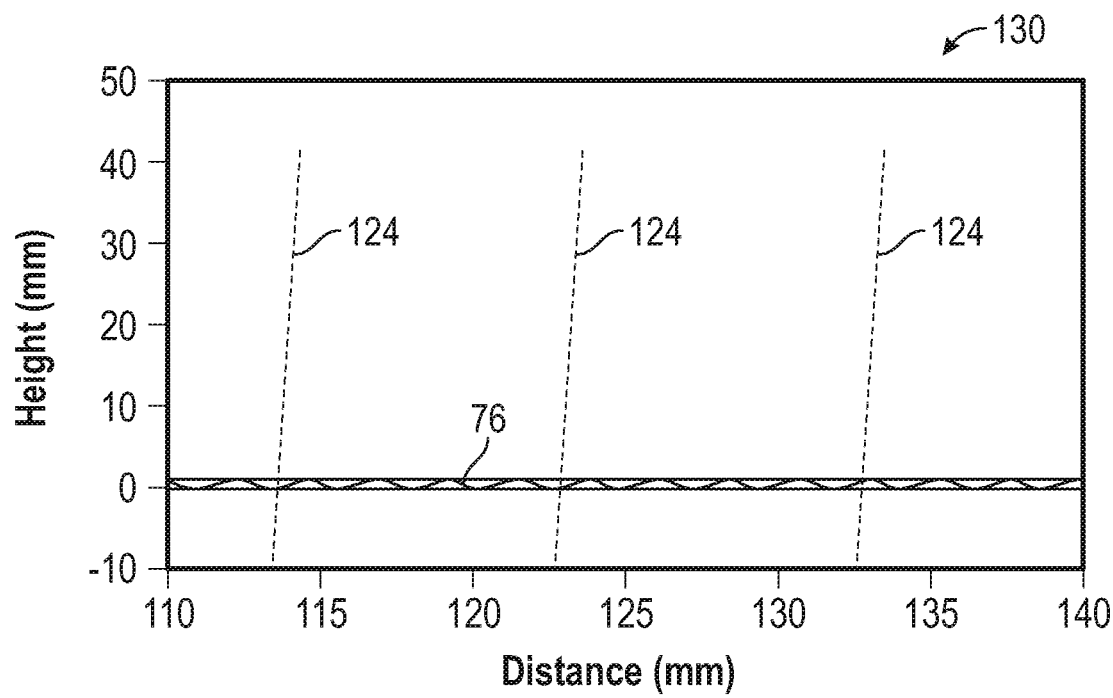
FIGS. 14 and 15 are graphical representation of example output of an exemplary embodiment of the output coupling and vertical expansion system illustrated in FIG. 13.

FIG. 14 illustrates a graph 130 of output of an exemplary embodiment of the output coupling and vertical expansion system 24. In particular, FIG. 14 illustrates image formation and reflection operation of reflecting elements 124 for the blue wavelength 76. Generally, images form at relatively large distances from the optical waveguide 12. Such distances increase as divergence of the beam exiting the output coupling and vertical expansion system 24 approaches zero (i.e., collimated condition). It should be noted that positioning of the reflecting elements 124 may be dependent on size restrictions imposed by the application, including distance common to a human head and human eye.

Figure 15:
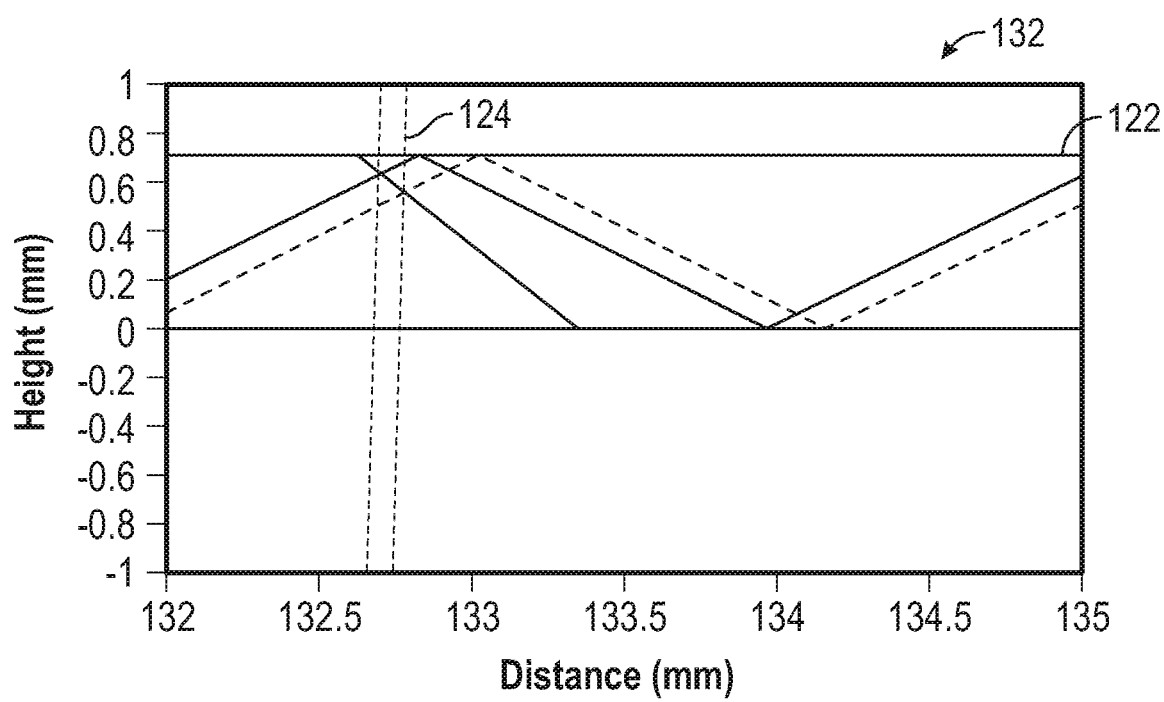

FIG. 15 illustrates a graph 132 of a guided beam striking the reflecting elements 124 along the length of the vertical waveguide 122. The percentage of power reflected may depend on the incident angle determined by the angle at which light travels along the vertical waveguide 122 and the angle of the reflective element 124. The divergence of rays exiting from the output coupling and vertical expansion system 24 may be different from the divergence within the vertical waveguide 122 if surfaces of the reflecting elements 124 are not flat, but instead configured with a degree of curvature. Curvature may alter the reflecting element 124 and as such provide a low power (i.e., long focal length) mirror, for example. As the reflection coefficient of a Fabry-Perot filter, for example, depends on angle of incidence, according to $\cos(\Theta)$, curvature of the reflecting surface may limit the range of incident angle to the range wherein $\cos(\Theta)\approx 1$. In some embodiments, collimated light propagating within the vertical waveguide 122 may strike one or more reflecting elements 124 configured to create a divergent beam that creates a virtual image for the user at a designed distance, such as the near point of the user's eye. Changes in the divergence of the light propagating within the vertical waveguide 122, configuration of adjustments to focal length of the diffraction enhanced imaging system 16 may create greater or less divergence of light from the reflecting elements 124 thus changing location of the virtual image and providing a more natural and/or comfortable viewing experience for a user.

What is claimed is:

1. An optical display system for providing three-dimensional convergence corrected images to a user, comprising:
    at least two image generators producing a plurality of rays forming a plurality of images;
    a diffraction enhanced imaging system configured to collect rays produced by the image generators and configured to control convergence angle of each ray at specific wavelengths into an optical waveguide such that rays at different wavelengths have different convergence angles;
    an in-coupling diffraction system configured to couple the rays controlled by the diffraction enhanced imaging system into the optical waveguide via at least one of specific convergence angles and a specific divergence angle;
    a wavelength compensated beam expander configured to simultaneously expand horizontal extension of the images and compensate for wavelength dispersion; and,
    an output coupling and vertical expansion system configured to magnify the images in a vertical direction and direct a fraction of light toward the user at one or more specific angles creating a wide field of view.

2. The optical display system of claim 1, wherein the in-coupling diffraction system uses diffraction to couple the rays into the optical waveguide at specific convergence angles such that at least one of the wavelength compensated beam expander and the output coupling and vertical expansion system produce an expanded beam of the rays having specific divergence angles.

3. The optical display system of claim 1, wherein the wavelength compensated beam expander simultaneously expand horizontal extension of the images and compensate for wavelength dispersion such that color components of each image pixel of each image overlap precisely at the output coupling and vertical expansion system.

4. The optical display system of claim 1, further comprising:
    a headset including a frame having at least one portion configured to rest on at least one of a nose or ear of the user, the frame having a front support element, wherein the at least two image generators are positioned on the front support element to provide a separate image to each eye of the user.

5. The optical display system of claim 4, wherein the diffraction enhanced imaging system includes at least one lens positioned in the frame of the headset, the lens comprising at least one diffractive portion and at least one refractive portion configured to alter wavelength dispersion effect on image distance produced by the lens.

6. The optical display system of claim 5, wherein the lens comprises:
    a first substrate layer formed of an optically clear material having known wavelength dispersion properties;
    a first diffractive grating layer positioned adjacent to the first substrate layer, the first diffractive grating layer is formed of a holographic material and includes a plurality of gratings, the gratings configured with a grating period impacting wavelength dispersion;
    a second diffractive grating layer positioned adjacent to the first diffractive grating layer and formed of substantially similar material and properties as the first diffractive grating layer, the second diffractive grating layer having a plurality of gratings; and,
    a second substrate layer positioned adjacent to the second diffractive grating layer and formed of an optically clear material.

7. The optical display system of claim 6, the lens further comprises a spacer layer formed of an optically clear material and positioned between the first diffractive grating layer and the second diffractive grating layer.

8. The optical display system of claim 6, wherein the first substrate layer includes a first surface and a second surface and at least one of the first surface and the second surface is a curved surface.

9. The optical display system of claim 6, wherein the second substrate layer includes a first surface and a second surface and at least one of the first surface and the second surface is a curved surface.

10. The optical display system of claim 6, wherein peaks of the gratings of the second diffractive grating layer lie at a substantially similar position as valleys of the gratings of the first diffractive grating layer.

11. The optical display system of claim 6, wherein at least one of the first substrate layer, first diffractive grating layer, second diffraction grating layer and second substrate layer consist of at least one material having a refractive index configured to be controlled by application of an electric field.

12. The optical display system of claim 6, further comprising a wedge element configured to provide at least one image at a different angle from an optical axis of the lens and a different distance from an output plane of the lens.

13. The optical display system of claim 6, further comprising a refractive element positioned adjacent to the lens, the refractive element being formed of dispersive material and configured to enhance wavelength dispersion of the lens.

14. The optical display system of claim 1, wherein the in-coupling diffraction system includes a single diffraction grating having a period configured to direct rays entering the in-coupling diffraction system to exit the in-coupling diffraction system at an angle conducive to propagation within the optical waveguide by total internal reflection.

15. The optical display system of claim 14, wherein period of the single diffraction grating alters ray cone for each wavelength to create a new image point configured as an input image for the wavelength compensated beam expander.

16. The optical display system of claim 14, wherein period of the single diffraction grating is configured to modify wavelength dispersion introduced by the diffraction enhanced imaging system.

17. The optical display system of claim 1, wherein distance between the diffraction imaging system and the in-coupling diffraction system is determined such that beam width for each color at an input plane of the in-coupling diffraction system and axis of beams intercepting the in-coupling diffraction system results in a beam of light that includes wavelengths having substantially similar beam width and beam axis when exiting the wavelength compensated beam expander.

18. The optical display system of claim 1, wherein the in-coupling diffraction system includes multiple diffraction gratings with each grating tuned to one of three RGB colors such that each diffraction grating controls imaging properties of each wavelength.

19. The optical display system of claim 1, wherein the wavelength compensated beam expander includes at least two optical elements positioned in series and each configured to alter wavelength dispersion properties of rays.

20. The optical display system of claim 19, wherein a first image produced by a first optical element is an input image for a second optical element.

21. The optical display system of claim 20, wherein the second optical element may be configured to produce collimated light for each wavelength with position and propagation direction of each output beam overlapping with beams for other wavelengths.

22. The optical display system of claim 19, wherein each optical element includes at least one of a reflective mirror, a single-axis Fresnel reflector, and a reflection grating.

23. The optical display system of claim 1, wherein the output coupling and vertical expansion system includes a vertically oriented waveguide having at least two reflecting elements configured to magnify images in a vertical direction and direct at least a fraction of light out of the vertically oriented waveguide and towards the user at specific angles to create the wide field of view.

24. A method, comprising:
collecting a plurality of rays forming images produced by a plurality of image generators and altering convergence angle of the rays at each wavelength such that rays at different wavelengths have different convergence angles;
coupling the rays into an optical waveguide system using diffraction at specific convergence and divergence angles;
expanding horizontal extent of each image;
compensating for wavelength dispersion such that color components of each image pixel overlap;
magnifying each image in a vertical direction; and,
directing a fraction of light out of the optical waveguide system and toward a user at specific angles to create a wide field of view.

25. An optical display system, comprising:
at least two image generators producing a plurality of rays forming a plurality of images; and,
a diffraction enhanced imaging system configured to collect rays produced by the image generators and configured to control convergence angle of each ray at specific wavelengths into an optical waveguide such that rays having different wavelengths have different convergence angles, the diffraction enhanced imaging system comprising a lens having at least one diffractive portion and at least one refractive portion configured to alter wavelength dispersion effect on image distance produced by the lens.

* * * * *

UNITED STATES PATENT AND TRADEMARK OFFICE
CERTIFICATE OF CORRECTION

PATENT NO. : 10,955,668 B2
APPLICATION NO. : 15/896889
DATED : March 23, 2021
INVENTOR(S) : Badia Koudsi and Hakki H. Refai Page 1 of 1

It is certified that error appears in the above-identified patent and that said Letters Patent is hereby corrected as shown below:

In the Specification

Column 8, Line 37: After "BCA," delete "AGB," and replace with -- ACB, --.

Column 11, Line 57: Delete "illistrates" and replace with -- illustrates --.

Column 15, Line 52: After "length" delete "I" and replace with -- 1 --.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*